A. D. DUNLEVY.
EGG TESTING DEVICE.
APPLICATION FILED APR. 24, 1912.
1,065,790.
Patented June 24, 1913.
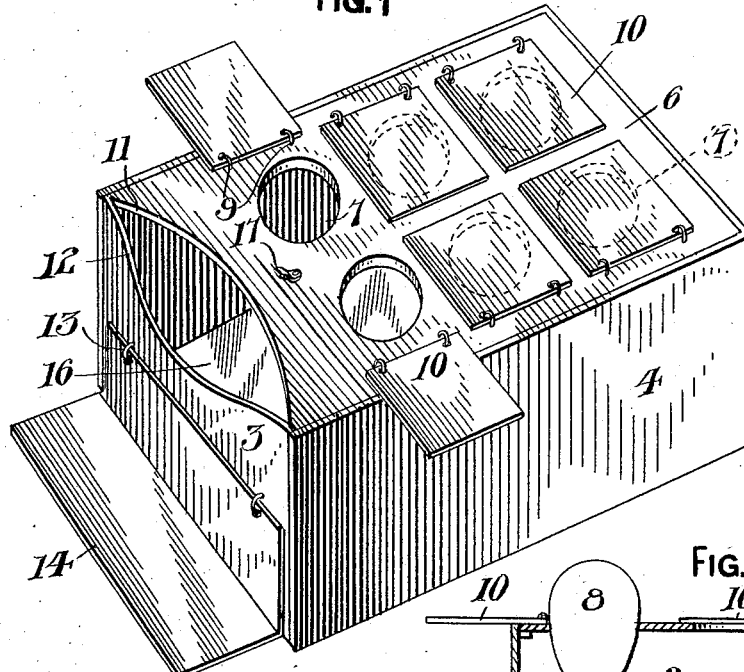
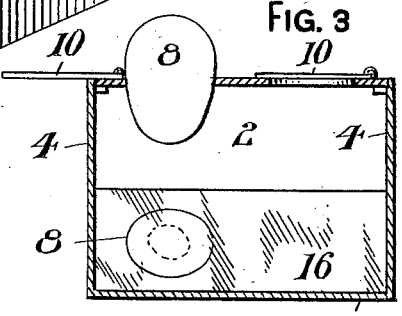
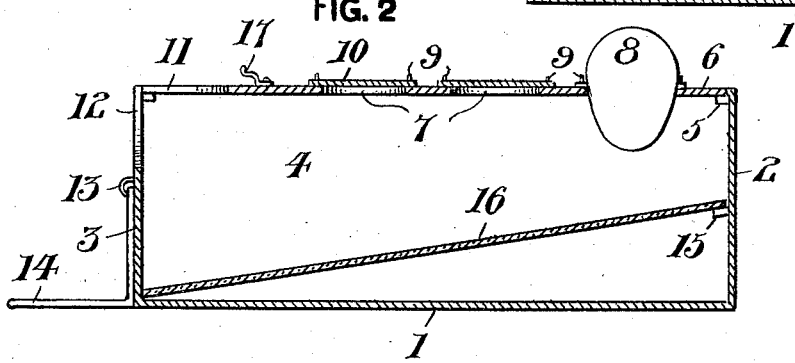
WITNESSES
INVENTOR
Albert D. Dunlevy
BY
ATTORNEYS

UNITED STATES PATENT OFFICE.

ALBERT D. DUNLEVY, OF STEUBENVILLE, OHIO.

EGG-TESTING DEVICE.

1,065,790.

Specification of Letters Patent. Patented June 24, 1913.

Application filed April 24, 1912. Serial No. 692,875.

*To all whom it may concern:*

Be it known that I, ALBERT D. DUNLEVY, a citizen of the United States of America, residing at Steubenville, in the county of Jefferson and State of Ohio, have invented certain new and useful Improvements in Egg-Testing Devices, of which the following is a specification, reference being had therein to the accompanying drawings.

This invention relates to an egg testing device, and the primary object of my invention is the provision of a novel egg holder in connection with which a plurality of eggs can be instantly tested.

Another object of this invention is to furnish an egg holder with a mirror for reflecting the egg within the holder, thereby not necessitating a direct line of vision through an egg to the source of light.

A further object of this invention is to accomplish the above results by an egg testing device that is extremely simple, durable, inexpensive and highly efficient for the purposes for which it is intended.

With the above and other objects in view, the invention resides in the novel construction, combination and arrangement of parts to be hereinafter specifically described and then claimed.

Reference will now be had to the drawing, wherein:—

Figure 1 is a perspective view of the egg testing device, Fig. 2 is a longitudinal sectional view of the same, and Fig. 3 is a cross sectional view of the egg testing device.

An egg testing device in accordance with this invention comprises a rectangular casing or box having a bottom plate 1, a rear wall 2, a front wall 3, and side walls 4. The upper inner edges of the side walls 4, at the front and rear walls, are provided with cleats 5 and resting upon said cleats is a detachable cover plate 6 that is provided with a plurality of openings 7 adapted to accommodate the ends of eggs 8. The cover plate 6, adjacent to the longitudinal edges thereof, is provided with staples 9 and loosely connected to said staples are lids 10 adapted to close the openings 7 by resting upon the cover plate 6.

The forward edge of the cover plate 6 is cut away, as at 11 and the upper edge of the front wall 3 is cut away, as at 12, these cut away portions providing a sight opening. The sight opening when the testing device is not in use, can be closed by an angle lid 14 connected to staples 13 that can be swung upwardly to close the sight opening and prevent foreign matter from entering the casing or box.

The inner side of the rear wall 2, intermediate the upper and lower edges thereof, is provided with a transverse cleat 15, and resting upon said cleat is one end of an inclined mirror 16 or reflector, the opposite end of said mirror or reflector engaging the front wall 3.

To retain the angle lid 14 in a closed position, the cover plate 6 is provided with a small pivoted clip 17 that can be swung over the edge of the lid 14.

Rays of light will penetrate the eggs 8 and make the same sufficiently transparent for the interior thereof to be observed by looking into the mirror or reflector 16. The condition of the eggs can be readily determined by the tester looking through the sight opening at the forward end of the casing or box, and such openings that do not contain eggs can be closed by the lids 10, thereby preventing the light from being reflected by the mirror and interfering with a proper observation of eggs that are to be tested.

From the foregoing it will be observed that I have devised an extremely simple egg testing device that can be made of wood, metal or any suitable material and of various sizes, and while in the drawing I have illustrated a preferred embodiment of my invention, it is to be understood that the same is susceptible to such changes as fall within the scope of the appended claim.

What I claim is:—

An egg testing device comprising a rectangular receptacle including top, bottom, side and end walls, said top wall being formed with parallel rows of openings for the reception of the ends of eggs, one upper corner of said receptacle being cut away transversely to provide a viewing opening arranged at the top and one end of the receptacle, oppositely disposed lids pivotally connected to the top of the receptacle and providing means for independently closing the egg receiving openings, an angle-shaped lid pivotally connected exteriorly of one end of the receptacle and capable of being swung onto the top of the receptacle for closing said viewing opening, and an inclined reflector arranged within the receptacle.

In testimony whereof I affix my signature in the presence of two witnesses.

ALBERT D. DUNLEVY.

Witnesses:
JOHN M. BIGGER,
JOHN A. KITHCART.

Copies of this patent may be obtained for five cents each, by addressing the "Commissioner of Patents, Washington, D. C."